C. R. HARRIS & L. W. LYONS.
ROLLER BEARING.
APPLICATION FILED JULY 24, 1916.

1,245,147.  Patented Oct. 30, 1917.

Inventors,
Charles R. Harris.
Lowell W. Lyons.
By Vernon E. Hodge
Their Attorney.

UNITED STATES PATENT OFFICE.

CHARLES R. HARRIS AND LOWELL W. LYONS, OF LOS ANGELES, CALIFORNIA, ASSIGNORS TO OVER ALL ROLLER BEARINGS COMPANY, OF LOS ANGELES, CALIFORNIA, A CORPORATION OF CALIFORNIA.

ROLLER-BEARING.

1,245,147.  Specification of Letters Patent.  Patented Oct. 30, 1917.

Application filed July 24, 1916. Serial No. 110,995.

*To all whom it may concern:*

Be it known that we, CHARLES R. HARRIS and LOWELL W. LYONS, citizens of the United States, residing at Los Angeles, in the county of Los Angeles and State of California, have invented certain new and useful Improvements in Roller-Bearings, of which the following is a specification.

Our invention relates to an improvement in roller-bearings of the type in which the rollers are all of uniform length, whether main rollers or idlers, in connection with other features, in which the friction due to end thrust is reduced to a minimum.

In the accompanying drawings:—

Figure 1:
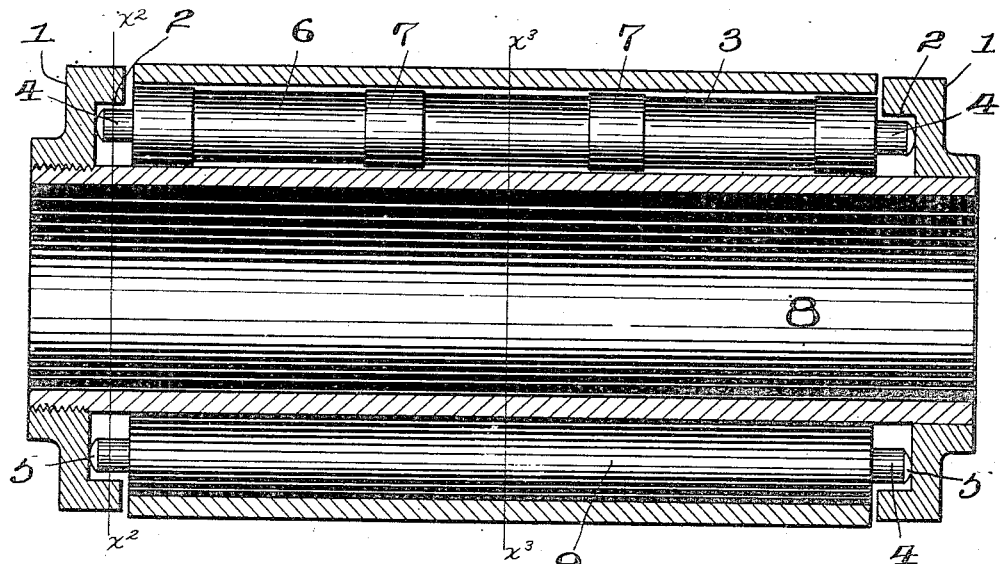
Figure 1 is a longitudinal section on the line $x'$—$x'$ of Fig. 2.
Figures 2, 3:
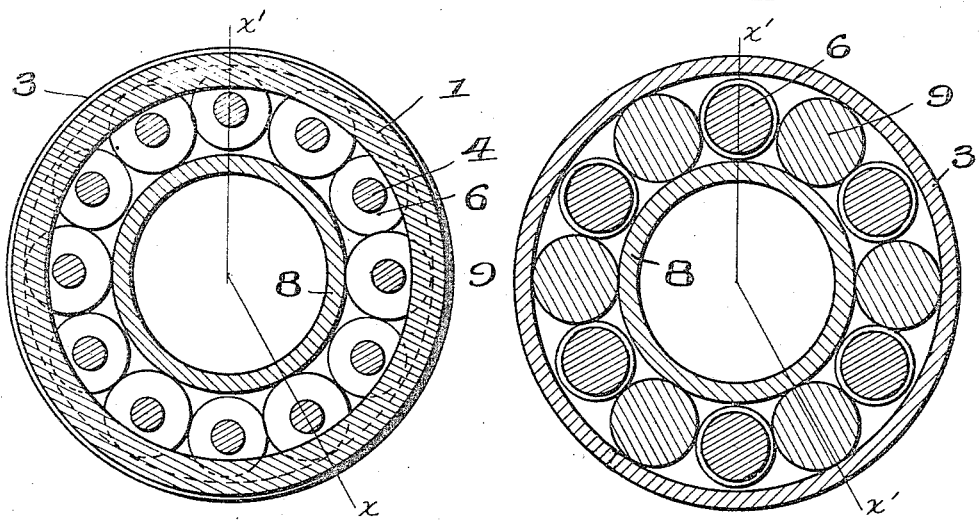
Fig. 2 is a transverse section on the line $x^2$—$x^2$ of Fig. 1.
Fig. 3 is a transverse section on the line $x^3$—$x^3$ of Fig. 1.

The numeral 1 represents a flange or collar screwed or held by friction, as preferred, as shown in Fig. 1, at the left and right ends upon the inner sleeve 8 of the bearing. These collars are provided with recesses 2 cut in the same to receive the reduced ends 4 of the bearing rollers 6 and 9, the extreme ends of which are rounded as at 5 to engage the ends of the flanges or collars at a point, thus reducing the end thrust friction to a minimum.

The roller-bearings are housed by an outer sleeve 3, which surrounds them, and the roller-bearings 6 are turned down and cut away at intermediate points, thus leaving the enlarged collars 7 at intervals, as shown in Fig. 1. This reducing of the intermediate portions allows space for air circulation to keep the roller-bearing cool.

The collar 7 engages and turns on the inner sleeve 8 and against the surface of the straight rollers 9.

In addition to the collars or flanges 1 being threaded or frictionally held in place, one might be turned integral with the inner sleeve 8, if desired.

Various other modifications might be made.

We claim:

1. A roller bearing comprising inner and outer sleeves and end flanges or collars, together with rollers of uniform length, the ends of which are rounded or convex, whereby to engage recesses in the flanges or collars at a point, thereby reducing friction to a minimum.

2. A roller bearing comprising inner and outer sleeves and end flanges or collars, together with straight and collared rollers of uniform length, the ends of which are rounded or convex, whereby to engage recesses in the flanges or collars at a point, thereby reducing friction to a minimum.

3. A roller bearing comprising inner and outer sleeves and end flanges or collars, together with rollers and idlers of uniform length, the ends of which are rounded or convex, whereby to engage recesses in the flanges or collars at a point, thereby reducing friction to a minimum, the main portion of said rollers and idlers being of different diameters.

4. A roller bearing comprising inner and outer sleeves and end flanges or collars, together with rollers and idlers of uniform length, the ends of which are rounded or convex, whereby to engage recesses in the flanges or collars at a point, thereby reducing friction to a minimum, the main portion of said rollers and idlers being of different diameters, and the reduced portions of said rollers and idlers having the same diameters.

5. A roller-bearing comprising inner and outer sleeves and end flanges or collars having recesses on their inner faces, straight and collared rollers of uniform length the ends of which are rounded or convexed and received within said recess whereby they are held collectively together.

6. A roller-bearing comprising inner and outer sleeves and end flanges or collars, having recesses in their inner faces, rollers and idlers of uniform length the ends of which are reduced in diameter and rounded or convexed and received within said recesses whereby they are held collectively together.

7. A roller-bearing comprising inner and outer sleeves and end flanges or collars, having recesses in their inner faces, rollers and idlers of uniform length the ends of which are reduced in diameter and rounded or convexed and received within said recesses whereby they are held collectively together, said outer sleeve of such a width as to be received between the inner face of said end flanges or collars.

In testimony whereof we affix our signatures.

CHARLES R. HARRIS.
LOWELL W. LYONS.